(12) United States Patent
Skauen

(10) Patent No.: US 10,703,449 B2
(45) Date of Patent: Jul. 7, 2020

(54) STABILIZER FIN FOR A WATERCRAFT

(71) Applicant: Ronny Skauen, Fredrikstad (NO)

(72) Inventor: Ronny Skauen, Fredrikstad (NO)

( * ) Notice: Subject to any disclaimer, the term of this patent is extended or adjusted under 35 U.S.C. 154(b) by 0 days.

(21) Appl. No.: 16/330,015

(22) PCT Filed: Sep. 2, 2016

(86) PCT No.: PCT/NO2016/050180
§ 371 (c)(1),
(2) Date: Mar. 1, 2019

(87) PCT Pub. No.: WO2018/044173
PCT Pub. Date: Mar. 8, 2018

(65) Prior Publication Data
US 2019/0202535 A1    Jul. 4, 2019

(51) Int. Cl.
*B63B 39/06* (2006.01)
*F16H 1/10* (2006.01)

(52) U.S. Cl.
CPC .......... *B63B 39/06* (2013.01); *F16H 1/10* (2013.01); *B63B 2039/067* (2013.01)

(58) Field of Classification Search
CPC ...... B63B 39/06; B63B 2039/067; F16H 1/10
See application file for complete search history.

(56) References Cited

U.S. PATENT DOCUMENTS

| 4,777,899 A | * | 10/1988 | Bettcher, Jr. ............ B63B 39/06 114/122 |
| 5,186,420 A | * | 2/1993 | Beauchamp ............. B63G 8/18 244/219 |
| 2007/0272143 A1 | | 11/2007 | Koop et al. |
| 2015/0259052 A1 | * | 9/2015 | Skauen ................... B63B 39/06 114/126 |

FOREIGN PATENT DOCUMENTS

| DE | 102014215982 A1 | 2/2016 |
| EP | 1577210 A1 | 9/2005 |
| EP | 2910463 A1 | 8/2015 |
| GB | 969469 A | 9/1964 |
| GB | 2530550 A | 3/2016 |
| WO | WO 2014065672 A1 | 5/2014 |

OTHER PUBLICATIONS

International Search Report submitted within International Patent Application No. PCT/NO2016/050180 dated May 23, 2017.

* cited by examiner

*Primary Examiner* — Stephen P Avila
(74) *Attorney, Agent, or Firm* — Birch, Stewart, Kolasch & Birch, LLP

(57) ABSTRACT

A stabilizer device for a watercraft with a hull. The stabilizer device includes a fin blade with a fin base, a fin tip, a leading edge, and a trailing edge, wherein a blade forward direction (fb) is defined from the trailing edge to the leading edge at the fin base, wherein the fin blade comprises a first fin connection element connected to the fin base in a first connection point a hull element arranged to be fixed to the hull with a hull forward direction (fh) in a forward direction of the hull, and a fin blade displacement portion connected to the first fin connection element and the hull element and arranged for displacing the first fin connection point a first displacement, in parallel with a lower surface of the hull, and perpendicular to the hull forward direction (fh).

17 Claims, 9 Drawing Sheets

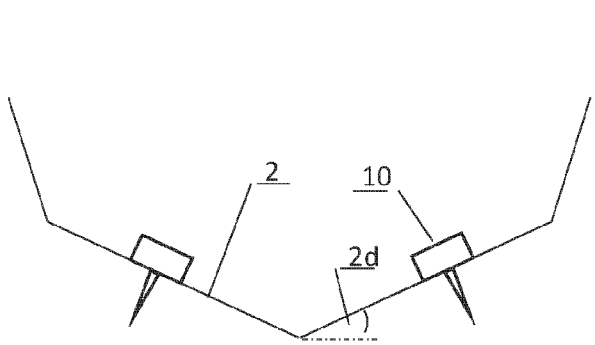
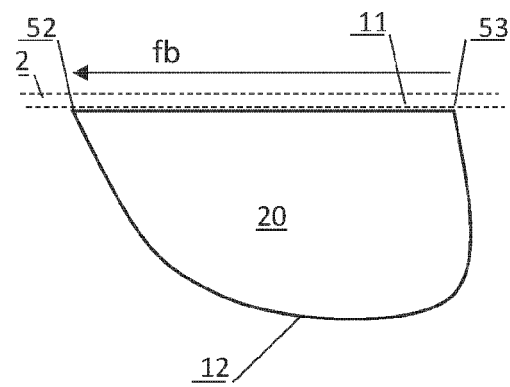
Fig. 1a          Fig. 1b
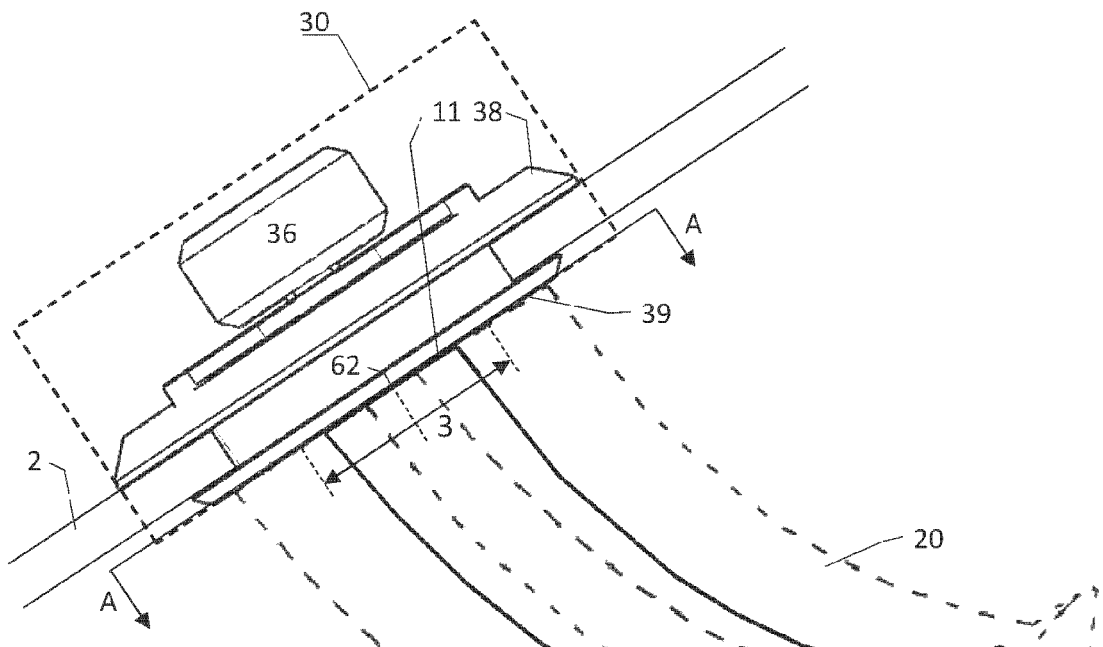
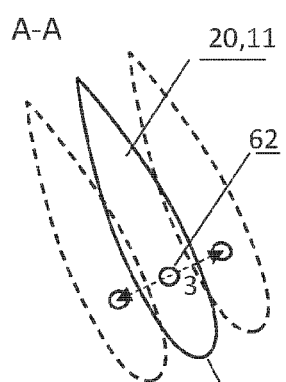
Fig. 2a
Fig. 2b

STABILIZER FIN FOR A WATERCRAFT

CROSS-REFERENCE TO RELATED APPLICATION

This application is a 35 U.S.C. § 371 National Phase Application of PCT Application No. PCT/NO2016/050180 filed Sep. 2, 2016. The disclosure of this prior application is hereby incorporated by reference herein in its entirety.

FIELD OF THE INVENTION

The present invention relates to the technical field of stabilizing a watercraft, primarily against roll that is unpleasant and at times unsafe for passengers and crew, but this invention also has improved capabilities for reducing sway and yaw consequences in comparison to traditional types of active fin stabilizer systems.

BACKGROUND ART

As evidenced by other patents and work over the last years, much effort has been put into creating fins with low drag, and powering systems that are as cost and energy efficient as possible. The art of reducing the unpleasant and at times dangerous roll motion of boats and ships in waves have evolved over many years, and there are many principle technologies used with varying benefits and results for different conditions, type of watercraft and not least cost of implementation and operation. Such different systems include fin stabilizers, gyro stabilizers and bilge tanks to mention the most common ones.

The traditional stabilization systems used in passenger vessels, naval vessels etc., were generally designed for use in underway situations and mostly for boats cruising in displacement mode and thereby in relatively low velocities. The watercrafts that have traditionally been using stabilizers, have also by their size and hull shapes generally had long roll times, thereby requiring relatively slow acting stabilization system, where counter forces are applied to the waves forces over relatively long time periods. Over the last 15 years, the market has evolved to a require roll stabilization when the watercraft is at anchor, i.e. not having any forward motion, as well as stabilization systems being installed in much faster boats, including planning boats. These changes create many new challenges and issues, as explained below.

One such known issue known issues is that with the watercraft not moving forward through the water, thus being able to make use of the forces in the waterflow passing the fins by the forward motion of the vessel to create a force to counter the waves forces that rolls the watercraft, the only way a fin stabilizer can apply a counter force, is to flap or swim the fins. This means that both the peak force possible as well as the time such a force can be applied is limited. The force is a result of the size of fin and the speed the fin is moved, and as an opposite, the faster the fin is moved, the shorter a time period the force can be applied as there is a limited physical movement of the fin, and it also has to be stopped without causing too much counter force in the undesired direction at the time. Mathematically, or as a term in physics, the total force impulse is in principal determined by the fin size.

A second issue, is the fact that modern faster watercrafts have a hull shape and a weight that makes their natural roll periods a lot shorter than the traditional vessels where stabilizers have been installed, and also that their physical requirement for stabilizer force is higher compared to the boat size in comparison with the traditional watercraft equipped with stabilizers. The principal mathematical way to calculate the necessary force of a stabilizing system to reduce the roll by a desired amount is mostly based on a factor called Metacentric height (GM). This is a factor decided by how stiff the watercraft is on the water, i.e. the more it follows the waves angles, the more force is required from the stabilizer system to counter this roll, and what a stabilizer system actually does, is to force the boat to not follow the waves angle.

Given the fact that these modern vessels both require more force, while also allowing a shorter period to apply this force, it is apparent that these vessels are much more difficult to stabilize.

The simple solution is to install very big fins to be able to reach the desired roll reduction force.

However, an issue that evidently has not been considered sufficiently, but is an important benefit in this invention, is that by using very large traditional fins to reach the desired roll reduction forces, this will also have other impacts on the vessels, the faster and lighter the watercraft, the more negative these impacts become. E.g., for a watercraft having 6 degrees of motion freedom in water, simply increasing the traditional force impulse will cause other negative effects on the watercraft by causing increased sway and yaw, both in underway and in at anchor situations. These effects are different from roll effects, but still uncomfortable and with negative effects on the boat.

At present, the overall market view is that fin stabilizers, even with the limitations of the present fins, provide the overall best solutions as a single technology system to use for both underway and at anchor stabilization, since most other solutions, like gyros or stabilization tanks, do not perform very well in underway situation of faster vessels. However, the problem of being able to apply enough force in at anchor situation, or at high speed with light weight vessels, without causing too many other negative implications on the watercraft, in general still remains to be solved for fin stabilizers.

One solution to improve this situation is presented in patent US 2007 0272143 and EP 1 577 210 that describes stabilizer fins that have the ability to change its size and shape, to thereby have different size in underway and at anchor situations, increasing the possible force without causing additional drag when not needed.

European patent application EP1577210 A1, describes an active roll stabilization system comprising fins with sub-elements, where the sub elements are movable, i.e. linked with respect to the fins.

One of the problems with prior art technology is that active roll stabilizers may cause the watercraft to sway or yaw due to the large forces applied on the stabilizers, and thereby creates another unpleasant movement for the passengers.

International application WO2014/065672 A1 discloses a curved stabilizer fin that improves the anti-roll efficiency of the fin and thereby also reduces the negative impact the fin movement has on the boat.

GB 2530550 A shows a pivoting flap that may be spring loaded.

GB 969 469 A discloses an arrangement for stabilizing ships, where lateral extending fins are rotated about an axis transverse to the direction of travel to reduce fin friction.

However, a major problem related to at anchor stabilization with fins rotating about a rotational axis connecting the fin to the hull, is that the paddling motion creates a forward directed force, trying to move the boat in a forward direction. When the boat is at anchor with an anchor line in the bow, the anchor line will prevent the boat from moving forward, and instead the boat will turn around. Eventually, the boats baseline will become parallel to the wave front, and the roll movement will increase. Thus, the advantages of the anti-roll system is actually reduced by the forces set up by the anti-roll system itself.

SHORT SUMMARY OF THE INVENTION

A main object of the present invention is to disclose an anti-roll system that solves the problems described above where the anti-roll system causes the boat to turn perpendicular to the waves, which again requires the anti-roll system to work harder.

To solve this problem, a stabilizer device for a watercraft according to the independent claims is disclosed, where the stabilizer device comprises;
- a fin blade with a fin base, a fin tip, a leading edge, and a trailing edge, wherein a blade forward direction is defined from the trailing edge to the leading edge at the fin base, wherein the fin blade comprises a first fin connection element connected to the fin base in a first connection point,
- a hull element arranged to be fixed to the hull with a hull forward direction in a forward direction of the hull, and
- a fin blade displacement portion (30) connected to the first fin connection element (61) and the hull element (38) and arranged for displacing the first fin connection point (62) a first displacement (3), in parallel with a lower surface of the hull (2), and perpendicular to the hull forward direction (fh), wherein the fin blade displacement portion (30) comprises a first link element (35) interconnecting the hull element (38) and the first fin connection element (61), and a fin displacement actuator (36) arranged to reversibly pivot the link element (35).

The vertical displacement component of the fin blade for e.g. V-shaped hulls, ensures that the force vector that acts on the hull will have a relatively larger vertical component than the longitudinal and lateral components compared to prior art. Since a larger part of the force vector is used for its intended purpose, which is to counteract the roll movement, the stabilizer fin according to the invention is more effective.

Further, a larger force can be obtained with the same fin area in the direction perpendicular to the longitudinal direction of the boat.

With the stabilizer according to the invention, the water is moved slower by the fin tip than in prior art. This reduces the force impulse per flap, but efficiency is increased since the whole of the fin surface participates in pushing the water in the anti-roll direction.

Since the same efficiency is obtained with a smaller fin amplitude, the stabilizer fin according to the invention are easier to mount under boats with strakes or chines protruding from the bottom surface of the hull.

In an embodiment the fin blade displacement means is further arranged for pivoting said fin base about said first connection point. This will further improve the efficiency of the stabilizer fin without causing problems related to paddling as described above, since the pivot or the rotation of the fin can counteract or contribute to such effects in a controlled manner.

FIGURE CAPTIONS

The attached figures illustrate some embodiments of the claimed invention.

FIG. 1a illustrates a front view of a cross section of a hull (2) of a boat with a pair of stabilizer devices (10).

FIG. 1b illustrates a typical geometry of a fin (20) that is used for the definition and description of the functionality of the stabilizer device (10).

FIG. 2a illustrates an embodiment of the stabilizer device (10) installed in the hull (2) of a boat. It further illustrates the lateral movement of the fin blade (20) obtained by this embodiment.

FIG. 2b illustrates section A-A of FIG. 2a, i.e., the fin blade seen (20) from above in different lateral positions.

EMBODIMENTS OF THE INVENTION

Figure 3A:
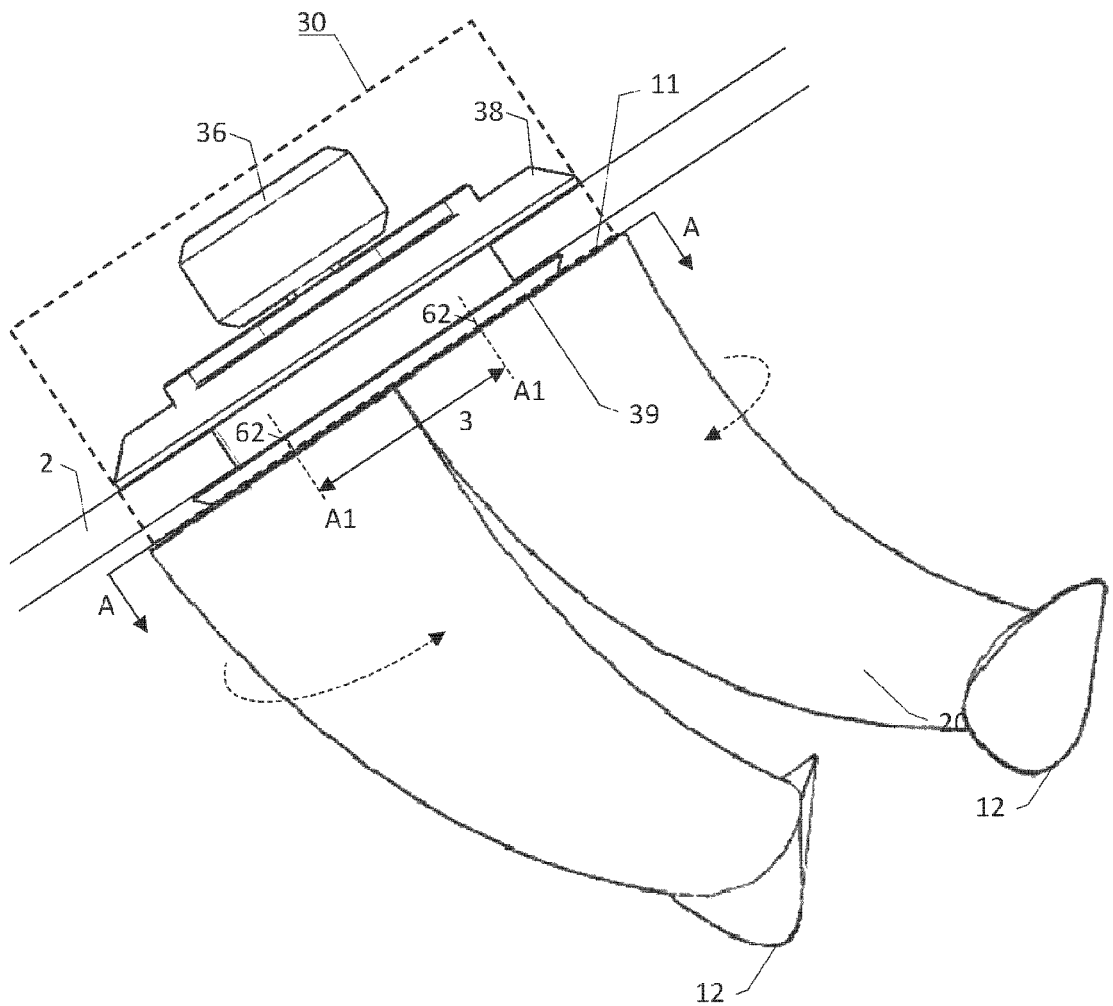
FIG. 3a illustrates an embodiment of the stabilizer device (10) installed in the hull (2) of a boat. It further illustrates the lateral and rotational movement of the fin blade (20) obtained by this embodiment.

The invention will in the following be described and embodiments of the invention will be explained with reference to the accompanying drawings.

FIG. 1a illustrates a typical application of the invention, wherein a front view of the cross section of a hull (2) of a boat (1), a fin blade (20) for stabilization of the boat (1) extend from each side of the boats hull (2). The fin blades (20) according to the invention are active, i.e. their position relative the boats hull (2) can be actively controlled by a control system to manipulate the boats behaviour.

For the description of the invention and the embodiments that follows, the generic geometry of the fin blade (20) of the stabilization device (10) is defined in the side view of FIG. 1a. The other elements of the stabilizer device have been left out on purpose. The fin blade (20) has a fin base (20) arranged for facing the hull (2) of the boat, a fin tip (12) opposite the fin base (11), a leading edge (52) arranged in the forward direction of the boat and a trailing edge (53)

opposite the leading edge (52), so that the fin blade (20) has a fin blade forward direction (fb) from the trailing edge (53) to the leading edge (52). The fin blade forward direction (fb) is defined to be along the fin base (11) since the fin tip (12) can have different curvatures.

The fin blade (20) also comprises a first fin connection element (61) connected to the fin base (11) in a first connection point (62). The first fin connection element (61) and the first connection point (62) are not visible in FIG. 2, but the location of the first connection point (62) in the plane shown, has been indicated by its reference number.

Further, the invention comprises a hull element (38) that is arranged to be fixed to the hull (2). It has a defined hull forward direction (fh) to be arranged in a forward direction of the hull (2). Thus, when the fin blade (20) is in line with the longitudinal direction of the boat, the fin blade forward direction (fb) and the hull forward direction (fh) are essentially parallel to each other. In FIG. 2, both the fin blade forward direction (fb) and the hull forward direction (fh) would point perpendicularly out of the plane shown. Thus, the hull element (38) should provide a stable foundation for the stabilizer device (10) as it has to withstand large forces when the fin blade (20) is acting on the surrounding water.

Common to all embodiments, in addition to the fin blade (20) above, the stabilization device (10) according to the invention, comprises a fin blade displacement means (30) illustrated by the stapled line in FIG. 2.

The fin blade displacement means (30) is connected to the first fin connection element (61) that is connected to the fin base (11) in the first connection point (62) on one side, and to the hull element (38) on the other side.

This means that the fin blade (20) and the hull element (38) are mechanically interconnected by the fin blade displacement means (30). Active fin movements will be defined relative to this definition.

According to the invention, and the definitions above, the fin blade displacement means (30) is further arranged for displacing the first fin connection point (62) a first displacement (3), in parallel with a lower surface of the hull (2), and perpendicular to the hull forward direction (fh).

This displacement is illustrated in FIG. 2a. For simplicity, and to illustrate an effect of the invention, the fin blade (20) is shown in three different positions controlled by the fin blade displacement means (30). As can be seen from FIG. 2a and FIG. 2b, the fin connection point (62) of the fin blade (20) is displaced a first displacement (3) in the lateral direction of the hull (2), where the forward direction of the hull is indicated by the direction arrow for the hull forward direction (fh).

The middle position of the fin blade (20) is illustrated by the solid line, an outer lateral position is illustrated by the fin blade to the right and an inner lateral position is illustrated by the fin blade to the left, both in dashed lines. Thus, the fin blade (20), and more specifically the first connection point (62) of the fin base (11), can be moved in and out with reference to the centreline of the hull (2).

Depending on the design of the hull (2) and the location of the stabilization device (10) on the hulls surface, the displacement (3) will usually have both a vertical and a horizontal component, as will be understood from FIG. 1a and FIG. 2. The first displacement (3) therefore becomes a function of the deadrise, such that a deep hull would have a larger vertical displacement than a shallow hull, given the same stabilizer device (10) had been used.

According to an embodiment, that can be combined with the embodiment above, and illustrated in FIG. 3a, the fin blade displacement means (30) is, in addition to displacing the fin connection point (62) laterally as described above, further arranged for pivoting the fin base (11) about the first connection point (62). The first connection point (62) is not illustrated in this figure, but as explained previously, the fin blade (20) and the fin blade displacement means (30) are mechanically interconnected by the first fin connection element (61) in the first connection point (62) of the fin base.

This pivotal movement, superimposed on the lateral movement, is illustrated in FIG. 3. For simplicity, and to illustrate an effect of the invention, the fin blade (20) is shown in two different positions controlled by the fin blade displacement means (30).

The outer lateral and inward rotated position is illustrated by the fin blade to the right and the inner lateral and outward rotated position is illustrated by the fin blade to the left. Thus, the fin blade (20), and specifically the fin base (11), can be pivoted, or rotated about the first connection point (62) in addition to the lateral displacement (3) of the first connection point (62).

Figure 3B:
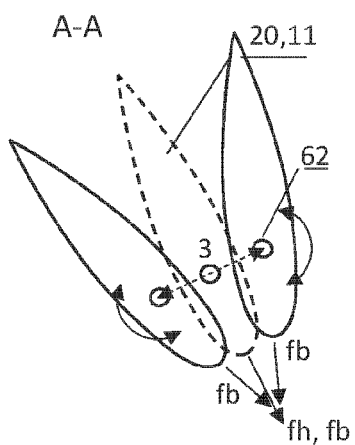
FIG. 3b illustrate section A-A of FIG. 3a, i.e., the fin blade seen (20) from above in extended lateral and rotational positions.
Figure 3C:
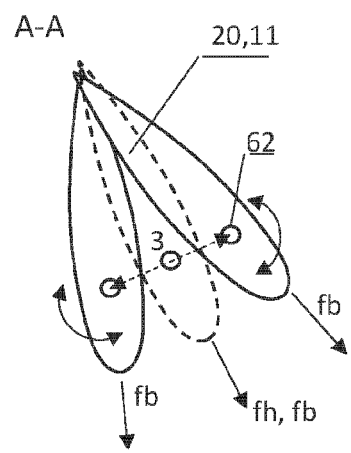
FIG. 3c is similar to FIG. 3b, except that different rotational positions of the fin is shown.

The section views in FIGS. 3b and 3c illustrate some example fin blade movements seen from above. Most importantly, they show combined lateral and rotational movement. Depending on the actual implementation of the fin displacement means (30), the possible rotation of the fin blades in a given lateral position may be free or restricted, i.e. where the rotation is a function of the lateral position. Some embodiments of the fin displacement means (30) will be described next.

In an embodiment, that can be combined with the embodiment above describing the pivot of the fin blade, the hull element (38) has a lower surface (39) facing the fin base (11), wherein the fin blade displacement means (30) is arranged for pivoting the fin base (11) about a first axis (A1), perpendicular to the lower surface (39), and through the first connection point (62). Since the position of the first axis (A1) is defined relative to the fin connection point (62) of the fin element (20), the first axis (A1) will move relative the hull element (38), as illustrated in FIG. 3a, where two lateral positions are shown.

In an embodiment that can be combined with any of the embodiments above, the fin blade displacement means (30) comprises a first link element (35), interconnecting the hull element (38) and the first fin connection element (61).

The link element (35) is arranged to pivot about a second axis (A2) that is fixed relative the hull element (38) and further perpendicular to the lower surface (39).

In an embodiment the link element (35) can be a link arm that is pivotally fixed to the hull element (38) in one end and fixed to the first fin connection element (61) in the other end. The pivot point where the link arm is fixed to the hull element (38) will define the second axis (A2). The link arm can be fixed with an axle through a bearing in the hull element (38), where the axle is further connected to the fin displacement actuator (36).

In another embodiment, the link element (35) is a wheel (41) with its rotational axis coaxial with the second axis (A2), wherein the first fin connection element (61) is fixed to a periphery of the wheel (41).

In an embodiment the hull element (38) comprises a circular opening (2h) in the lower surface (39), and the wheel (41) is arranged to rotate in the circular opening (2h). To reduce friction, a bearing (44), can be inserted between the hull element (38) and the wheel (41) as illustrated in FIG. 6b. Alternatively, the rotating components can be manufactured in a bearing material.

In order to pivot the link element (35), e.g. in the form of a link arm or a wheel (41), the fin blade displacement means

(30) comprises in an embodiment a fin displacement actuator (36) arranged to reversibly pivot the link element (35). Since the link element (35) interconnects the fin blade (20) and the fin hull element (38), the fin blade (20) will follow the link element (35) when the actuator forces the link element (35) to pivot about the second axis (A2).

Figure 6A:
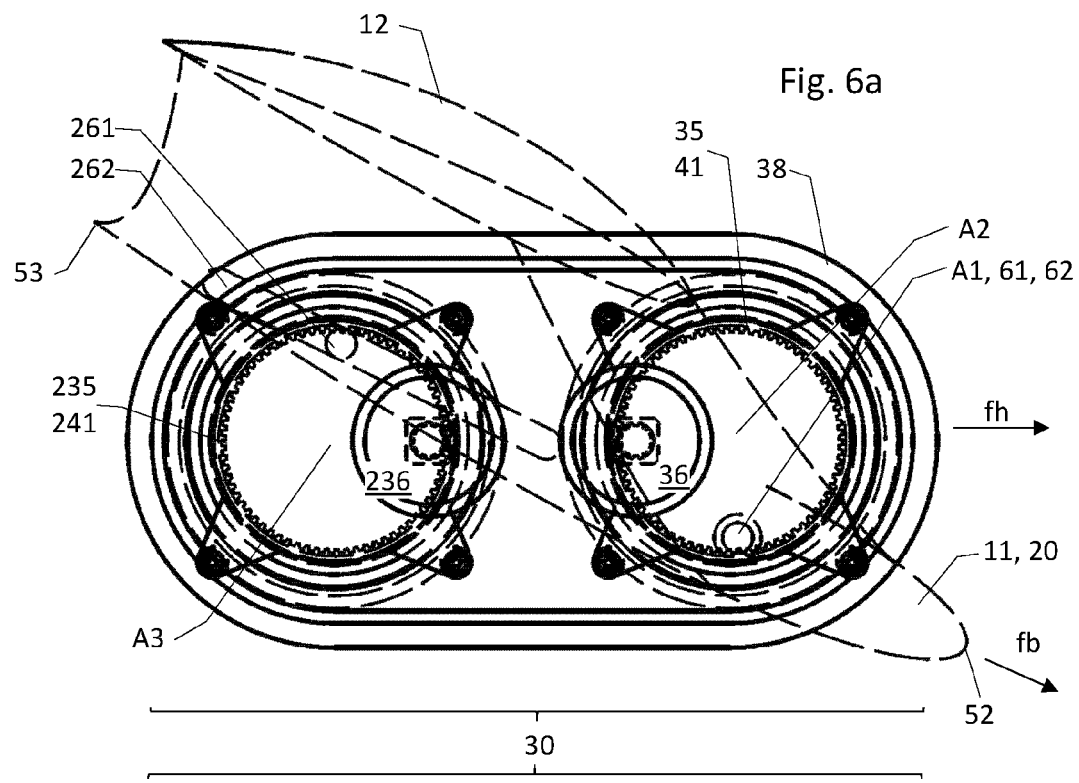
FIG. 6a illustrates in a transparent, partial view an embodiment of the invention.
Figure 6B:
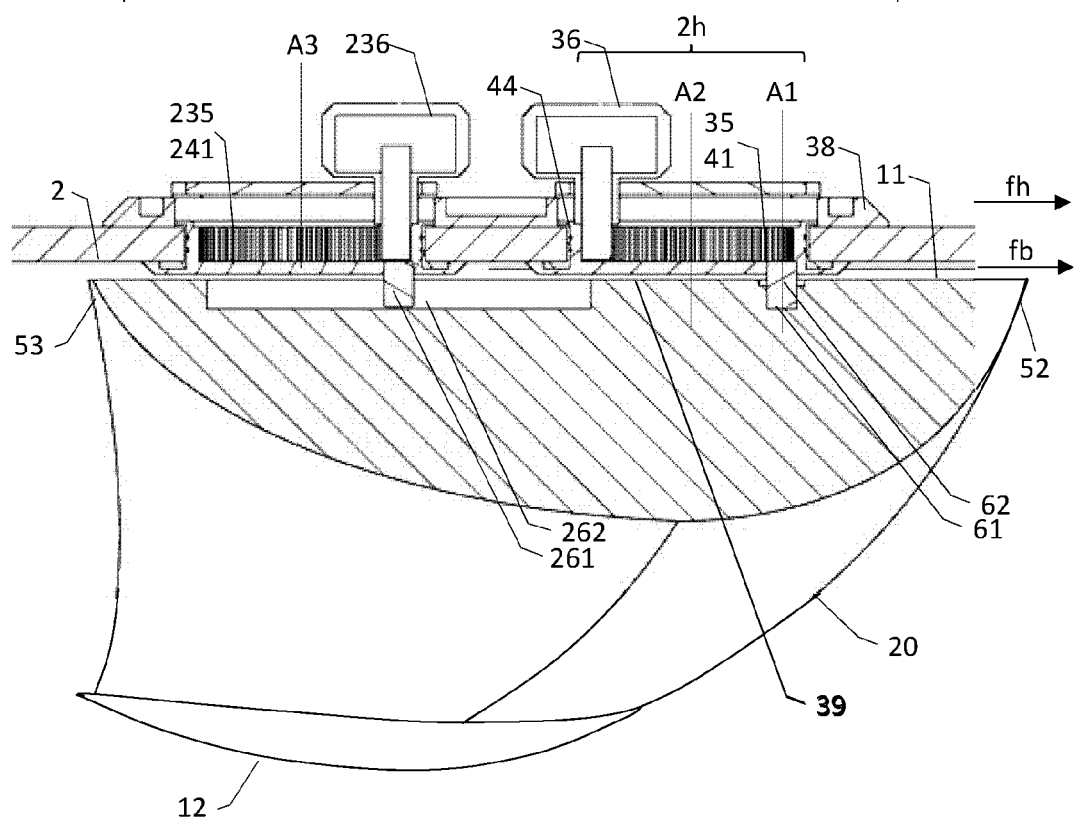
FIG. 6b illustrates in a sectional view, the embodiment of the FIG. 6a rotated 90 degrees.

FIGS. 6a and 6b illustrate the use of a wheel (41), in the specific embodiment the wheel (41) is a cog wheel with internal teeth, and a toothed axle of the fin displacement actuator (36) meshes with the teeth of the wheel. By running the actuator in the one or the other direction, the first connection point (62) on the fin blade (20) will run along a sector of the circumference of the wheel.

The embodiments up to this stage are named common embodiments and can be combined with more specific embodiments that will be described in more detail below.

In an embodiment that can be combined with any of the common embodiments above, the first fin connection element (61) is an axle rotationally fixed to the fin base (11), and extending out of the fin base (11).

With the first fin connection element (61) rotationally fixed to the fin blade, the fin rotation about the first axis (A1) can be controlled by forcing rotation of the first connection element (61) to achieve the desired effect.

The fin blade displacement means (30) in this embodiment is therefore arranged for pivoting the first connection element (61) about the first axis (A1).

The embodiments that follows can be placed in two main groups; wherein the first group, the rotation of the fin blade (20) is a fixed function of the lateral, first displacement (3). In other words; the fin rotation is given by the lateral position of the first connection point (62) relative the hull element (38).

If a wheel or link arm is used, this corresponds to a fixed function of the link arm or wheels rotation or pivot about the second axis (A2).

In this first group, the fin blade displacement means (30) is arranged for pivoting the fin base (11) about the first axis (A1) in a rotational direction opposite the rotation of the wheel or link arm about the second axis (A2).

Figure 4A:
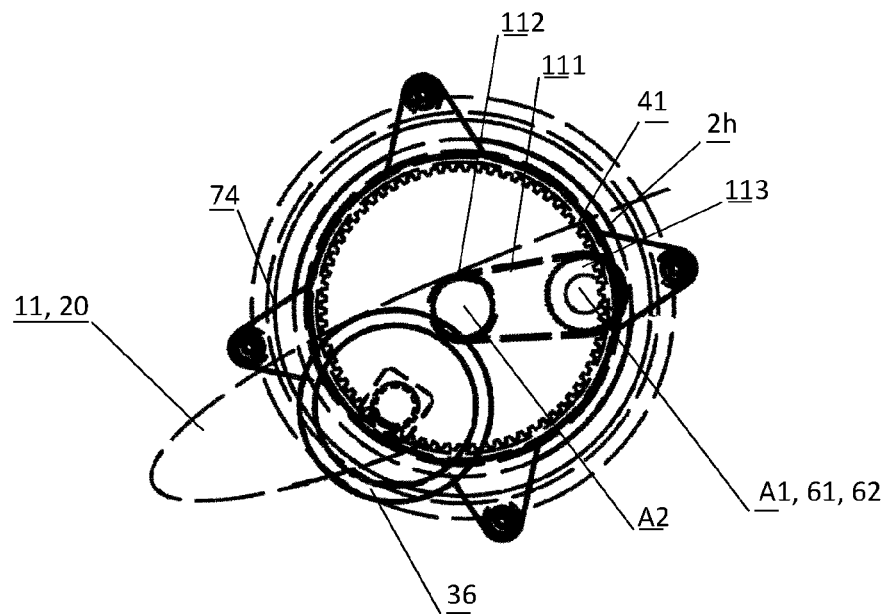
FIG. 4a illustrates in a transparent, partial view an embodiment of the invention.

In an embodiment related to this first group, and illustrated in FIG. 4a, the fin blade displacement means (30) comprises a mechanical transmission (110) interconnecting the fin displacement actuator (36) and the fin connection element (61).

In FIGS. 4a, 4b, 4c, and 4d, the mechanical transmission has a fixed gearing and comprises a belt (111), a first pulley (112) and a second pulley (113). The first pulley (112) is rotationally fixed to —, and rotates with the first link element (35), with its center in the second axis (A2).

The second pulley (113) is rotationally fixed to the fin base (11) via the fin connection element (61).

When the fin displacement actuator (36) is operated, it will first of all rotate the link element (35) as describe previously to displace the fin blade (20). As soon as the actuator is operated, it will also start acting on the fin connection element (61) to rotate the fin blade (20). Thus, the desired displacement and rotation of the fin blade (20) can be achieved with only one actuator.

Figure 4B:
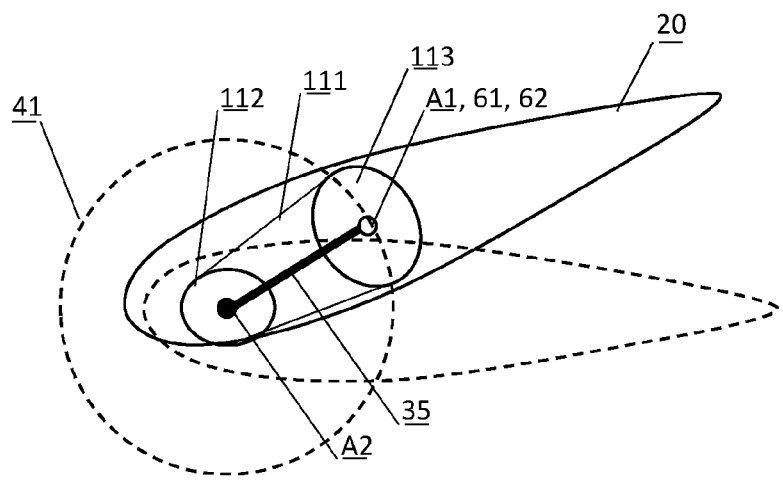
FIG. 4b illustrates conceptionally a variant of the embodiment in FIG. 4a rotated 90 degrees.
Figure 4C:
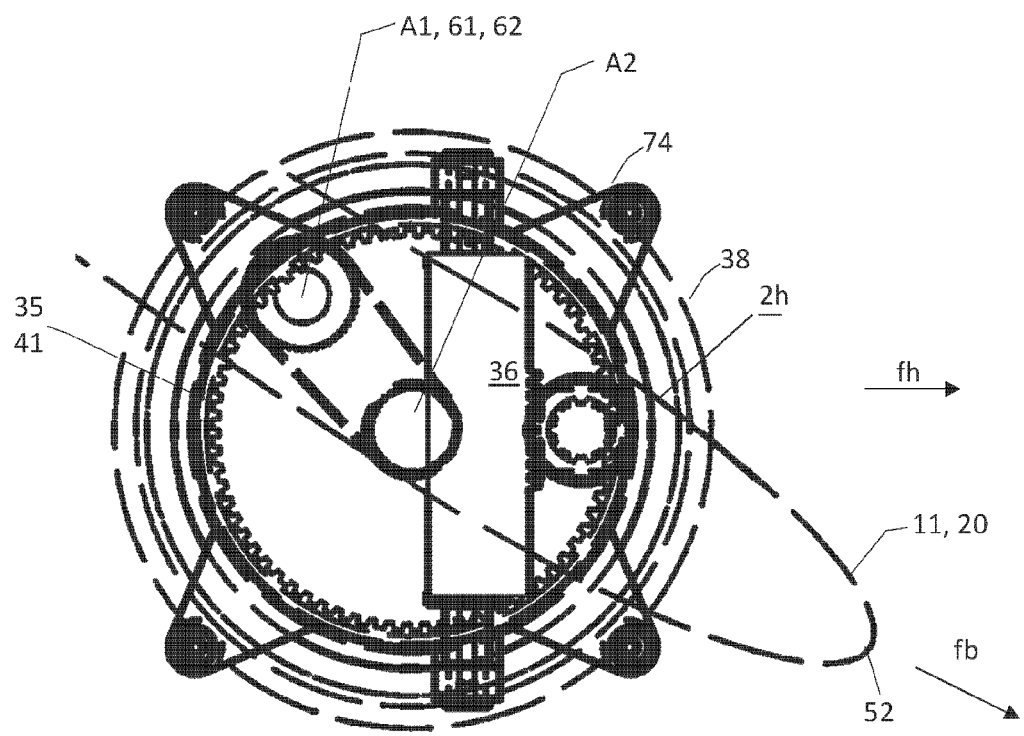
FIG. 4c illustrates in a transparent, partial view an embodiment of the invention.

A variant of the pulley driven embodiment above is shown in FIG. 4b. Here the pulleys are elliptical, which allows the rotational speed of the fin to be dependent upon the lateral position. Depending on the relative size and characteristics of the pulleys, a specific fin behavior can be implemented.

A similar embodiment can be made by replacing the belt and pulleys with chain and chain wheels, or only cog wheels.

In the latter configuration, a third, intermediate cog wheel can be used to retain the desired rotational direction of the fin blade relative the rotation of the link element (35).

In FIG. 4a, the fin displacement actuator (36) illustrated is electric. However, it may be of any suitable type, and in FIGS. 4c and 4d the illustrated actuator is of an hydraulic type.

Figure 4D:
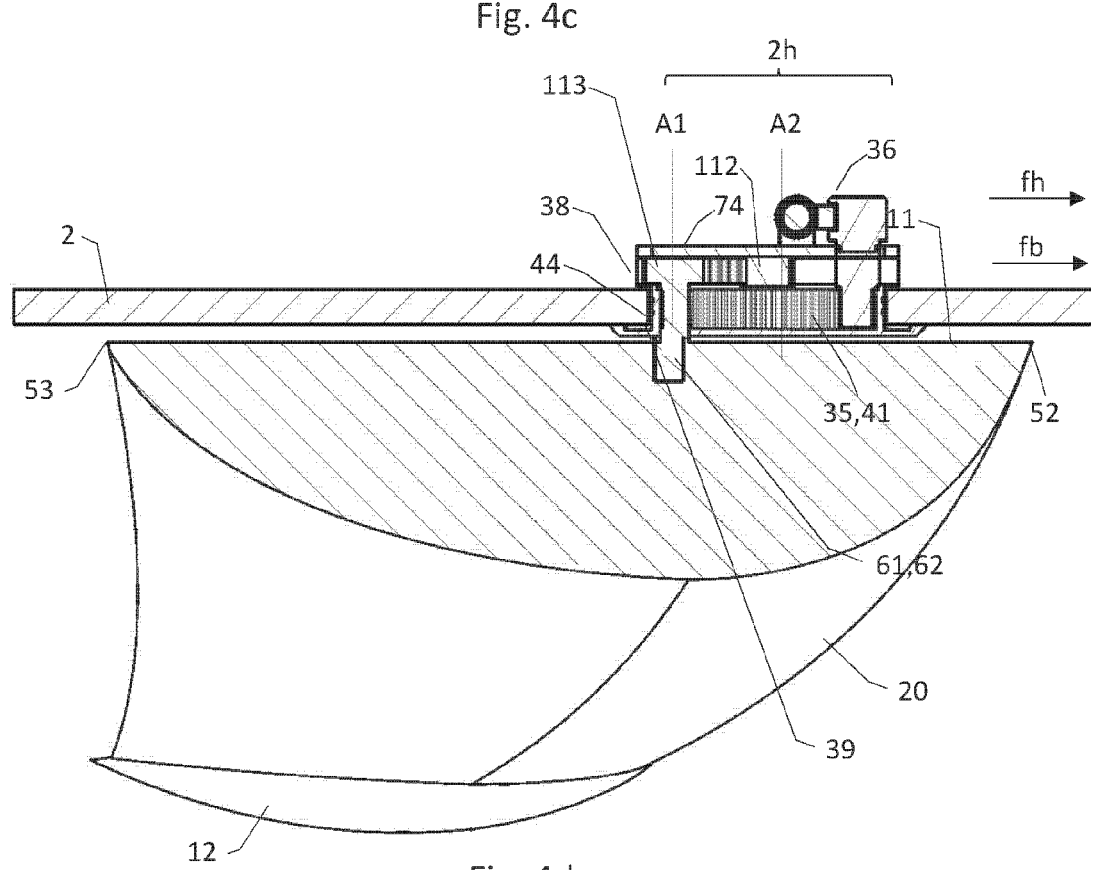
FIG. 4d illustrates in a sectional view, the embodiment of the FIG. 4c rotated 90 degrees.

In addition, FIG. 4d shows a cross section of an embodiment with pulleys and a hydraulic actuator (36). The fin displacement actuator (36) rotates the wheel (41) about the second axis (A2), and simultaneously it rotates the fin about the second axis (A1). This second rotation occurs via the belt (111) and the pulleys (112, 113). The rotation about the first axis (A1) is opposite the rotation about the second axis (A2).

Although pulleys and chain wheels have been proposed for the implementation of the mechanical transmission (110), other types of transmissions may also be used according to the invention, including varying gear rate, etc.

Further, in an embodiment related to the common embodiments above, the fin blade displacement means (30) comprises a break interconnecting the fin displacement actuator (36) and the fin connection element (61). The break allows the fin (20) to rotate with the link element (35) a pre-defined rotational angle. Above the pre-defined angle, the fin rotation is limited by the brake. Thus, the effect is that the brake forces the fin blade (20) to rotate relative the link element (35) about the first axis (A1), when the link element (35) rotates more than said pre-defined angle about the second axis (A2).

In a related embodiment, the brake is progressive, i.e. brake force varies with the rotational angle of the link element (35) about the second axis (A2). It is then possible to obtain a non-linear relationship between lateral displacement of the fin related to the rotation about the second axis (A2) and the fin rotation about the first axis (A1). The link element (35) may be a wheel or similar as previously described, also for this embodiment.

In the second group, the rotation of the fin blade (20) can be controlled independently of the rotation of the wheel or link arm (35). This has certain advantages, and makes the stabilizer more versatile for the different applications that can be foreseen, such as at anchor, cruising and swimming modes.

In an embodiment that can be combined with any of the general embodiments above, and where the first fin connection element (61) is an axle rotationally fixed to the fin base (11), the fin blade displacement means (30) comprises a first fin rotation actuator (136) arranged for rotating the first fin connection element (61). This is illustrated in FIGS. 5a and 5b.

Preferably the output axle of the fin rotation actuator (136) is coaxial with—and connected directly to the first fin connection element (61). In the case where a link element (35), such as a link arm or a wheel (41) is used, the fin rotation actuator (136) is arranged on the link element (35) to move with the first fin connection element (61).

Figure 5A:
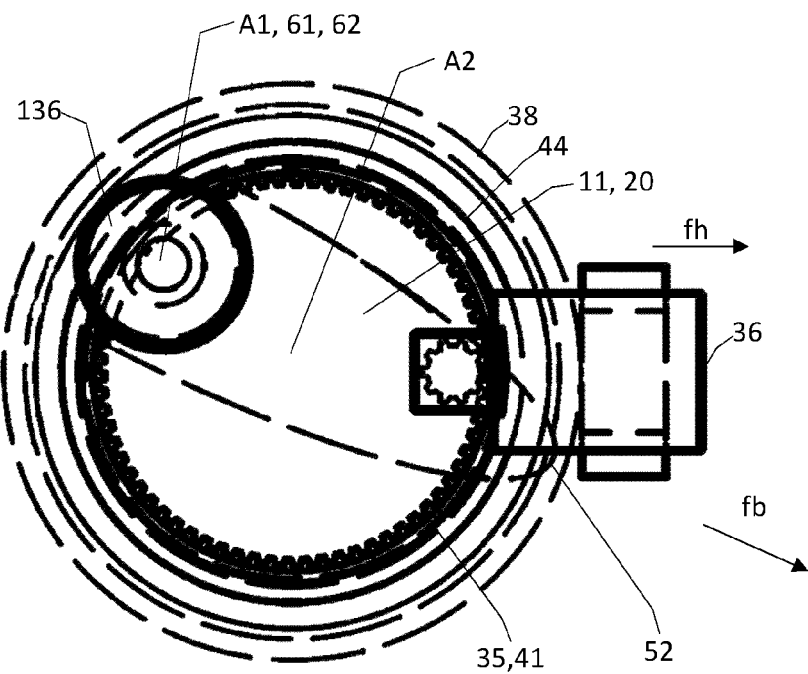
FIG. 5a illustrates in a transparent, partial view an embodiment of the invention.
Figure 5B:
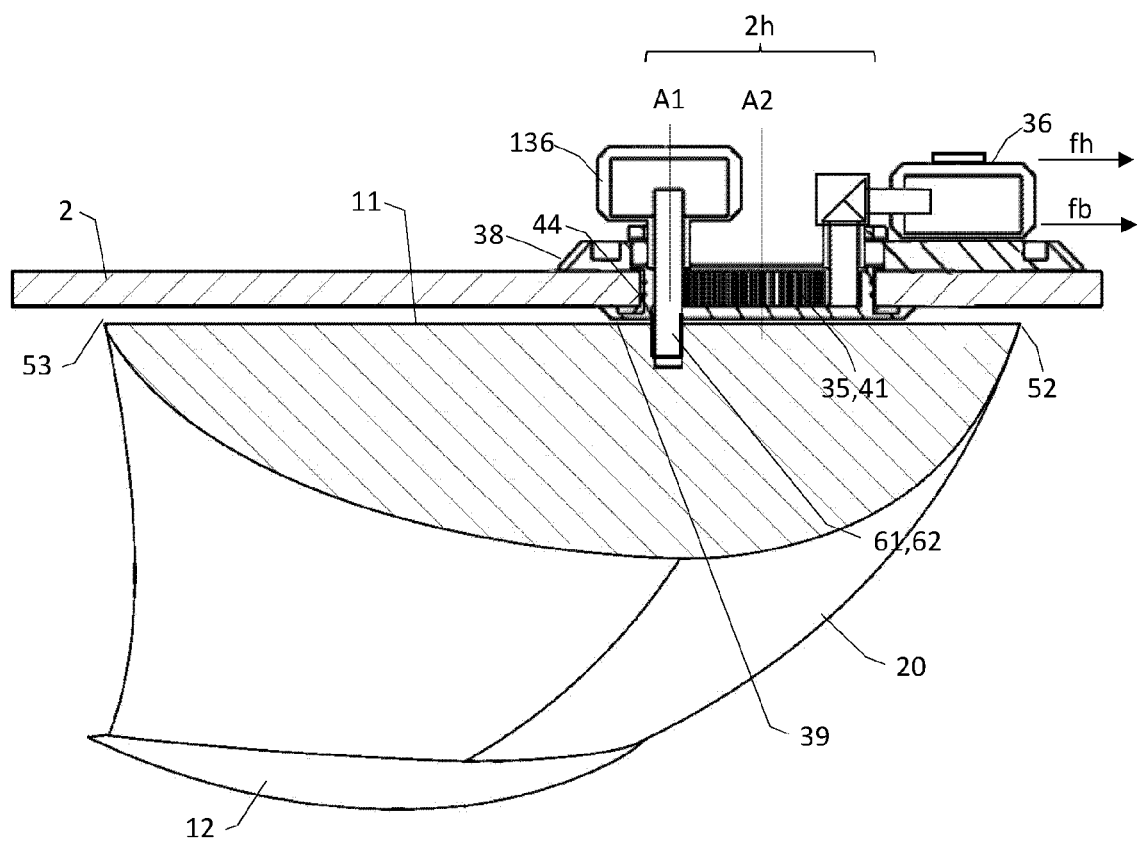
FIG. 5b illustrates in a sectional view, the embodiment of the FIG. 5a rotated 90 degrees.

In FIGS. 5a and 5b the housing of the fin rotation actuator (136) is fixed to the periphery of the wheel (41). When operated, the fin rotation actuator (136) will set up a force that will rotate the fin blade (20) relative the wheel (41).

The fin rotation actuator (136) therefore travels with the fin (20), along the sector defined by the rotation of the link element (35), or wheel, about the second axis (A2). By operating the fin rotation actuator (136), the fin blade direction (fb) may be controlled independently of the position of the link element (35), which in the embodiment of FIGS. 5a and 5b, is controlled by the fin displacement actuator (36).

In an embodiment that can be combined with any of the common embodiments above, and illustrated in FIGS. 6a and 6b, the stabilizer device comprises a second link element (235) and a second fin connection element (261) that is extending from the fin base (11) and fixed in a lateral direction relative the fin base (11), wherein the second link element (235) interconnects the hull element (38) and the second fin connection element (261) and wherein the fin blade displacement means (30) is further arranged for displacing the second fin connection element (261) and the fin base (11) laterally relative the hull forward direction (f) to rotate the fin blade about the first axis (A1). The second link element (235) is preferably parallel to the lower surface (39).

In the embodiment illustrated in FIG. 6, the fin blade displacement means (30) comprises a fin rotation actuator (236) arranged to act on the second link element (235).

In an embodiment (not illustrated) the second link element (235) can be a link arm that is pivotally fixed to the hull element (38) in one end and fixed to the second fin connection element (261) in the other end. The pivot point where the link arm is fixed to the hull element (38) will define the third axis (A3). The link arm can be fixed with an axle through a bearing in the hull element (38), where the axle is further connected to the fin rotation actuator (236).

In another embodiment the second link element (235) is a second wheel (241) with its rotational axis (A3) perpendicular to the lower surface (39), and fixed relative the hull element (38), wherein the second fin connection element (261) is fixed to a periphery of the second wheel (241) and the second wheel (241) is driven by a fin displacement actuator (236).

FIG. 6 illustrates the use of the second wheel (241). in this embodiment the wheel (241) is a cog wheel with internal teeth, and a toothed axle of the fin displacement actuator (236) meshes with the internal teeth of the wheel. By running the actuator (236) in the one or the other direction, the second fin connection element (261) on the fin blade (20) will run along a sector of the circumference of the wheel, and force the fin blade to rotate, or pivot about the first axis (A1).

In a related embodiment the fin blade (20) has a longitudinal groove (270) in its fin base (11), accommodating the second fin connection element (261), and allowing the second fin connection element (261) to travel along the length of the groove (262), as illustrated in FIG. 6.

Thus, the first and second link elements (35, 235) can be of similar configuration as described in FIG. 6, where they both comprises internal cog wheels (41, 241) operated by individual actuators (36, 236) meshing with the respective cog wheels. The cog wheels are connected to the fin base (11) in two different locations, i.e. the first connection point (62) and the groove (262) with respective first and second fin connection elements (61, 261). The first connection element (61) is arranged rotatably in the fin blade (20) to allow rotation of the fin blade about the first axis (A1) independent of the position of the first wheel (41).

In a different embodiment the hull element (38) comprises a slider (not illustrated), wherein the second link element (235) is arranged to slide on the slider in the hull forward direction (fh). In this embodiment the second fin connection element (261) is arranged fixed in the fin in the longitudinal direction, and the variable distance between the first and second link elements (235) is taken up by the slider.

Figure 8A:
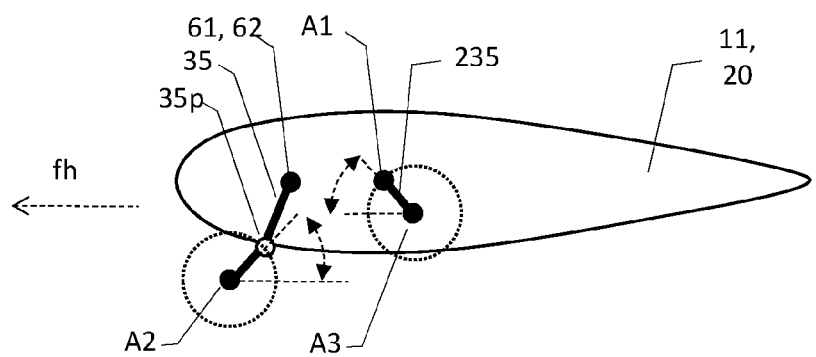
FIGS. 8a and 8b illustrate embodiments of the invention with one and two two-link linkages, respectively.

In an embodiment related to the common embodiments above, the first link element (35) is a two-link linkage as illustrated conceptually in FIG. 8a, where the fin (20) is illustrated from above. The linkage pivot point (35p) is marked as an open circle, while the second axis (A2) fixed relative the hull element (30) and the first connection element (61) are illustrated with filled circles.

When the linkage is rotated about the second axis (A2) by the actuator (36), the fin (20) will be forced the second axis (A2). The requirement is that the fin (20) is connected to the hull element (38) in a second location with a second link element (235). The second link element (235) can be of an embodiment described previously, or as in FIG. 8a, where it is a link arm or a wheel, as illustrated by the dotted line, rotating about the third axis (A3). Rotation has been illustrated by dotted arrows.

Figure 8B:
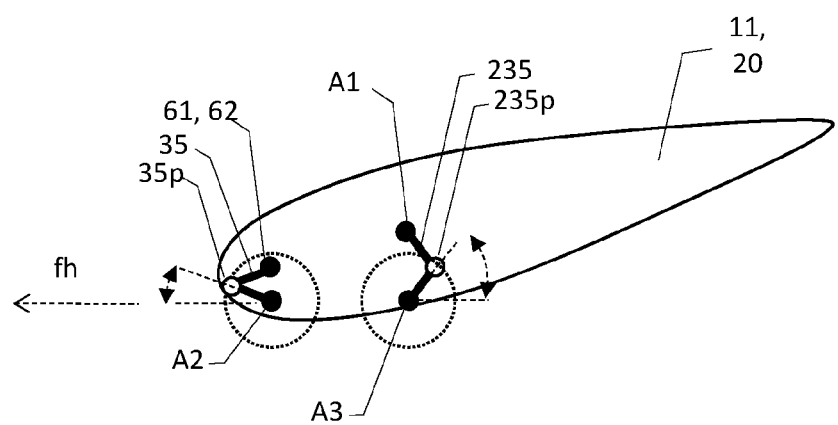

In an alternative embodiment illustrated in FIG. 8b, the second link element (235) is a second linkage with a second linkage pivot point (235p). In this embodiment independent lateral and rotational movements can be achieved by rotating the first and second linkages (35, 235) about the second and third axis (A2, A3) fixed to the hull element (38). This rotation can be achieved by first and second actuators as described previously.

An embodiment of the hull element (38) will now be explained in more detail. It should be noted that the hull element (38) can be manufactured in many different ways and in different materials within the scope of the invention.

A main objective of the hull element (38) is to provide a fixed reference point in the hull (2) for the stabilizer device (10). The hull element (2) has to withstand large forces from the fin blade (20) acting on the surrounding water to stabilize the boat.

Preferably, the hull element (38) can be mounted to the hull (2) in a separate process, after the hull has been manufactured.

Figure 7A:
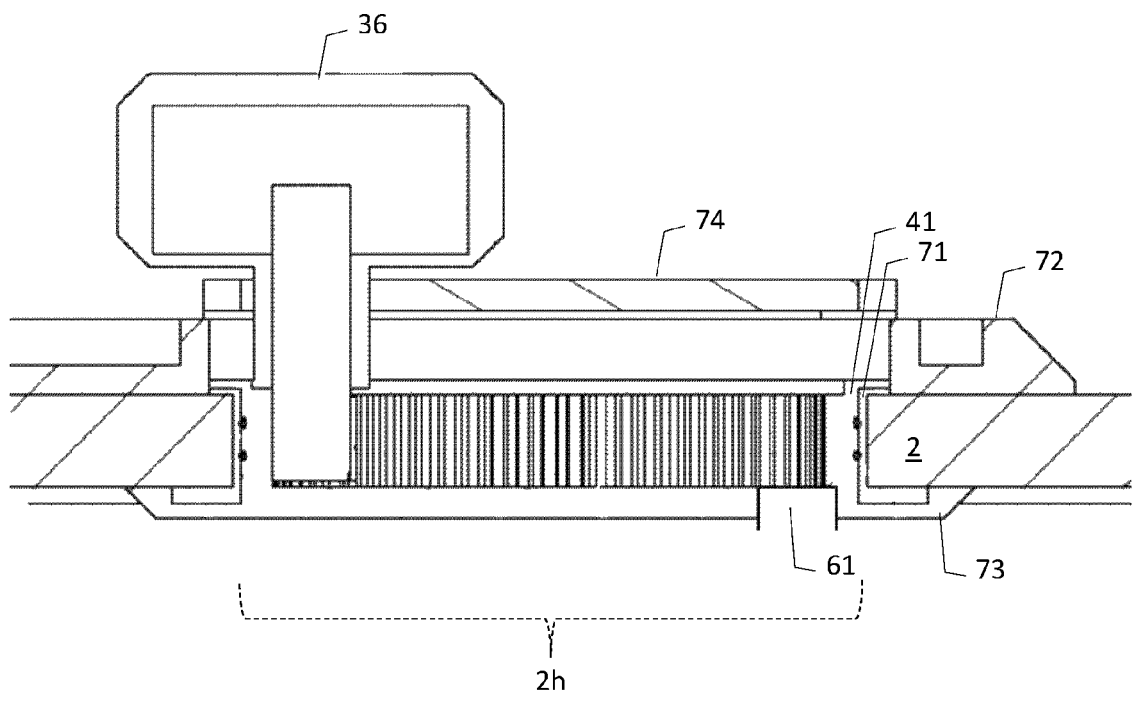
FIG. 7a illustrates a simplified section view of a detail of the hull element (38) and the rotating inner cog wheel (41) according to an embodiment of the invention.

In FIG. 7a, a section view of a part of the hull element (38) is illustrated. This installation requires a through hole (2h) in the hull (2). In the hole (2) the first wheel (41) can rotate freely due to the circular bearing (44) arranged between the walls of the hole (2h) and the first wheel (41). As can be seen, the first wheel (41) has a sleeve (73) beneath the hull (2), arranged to seal against the bottom of the hull (2), to protect other components of the stabilizer device from the sea. The first wheel (41) and/or the bearing (44) can in an embodiment be split horizontally (not shown in the figure) to allow mounting through the through hole (2h). Further the hull element (38) comprises an upper mounting frame (72) mounted to the hull (2) from inside, arranged to fix and stabilize the first wheel (41) to the hull (2).

Above the first wheel (41), an actuator frame (74) is shown. The actuator frame (74) is fixed to the mounting frame (72) and holds the fin displacement actuator (36).

Figure 7B:
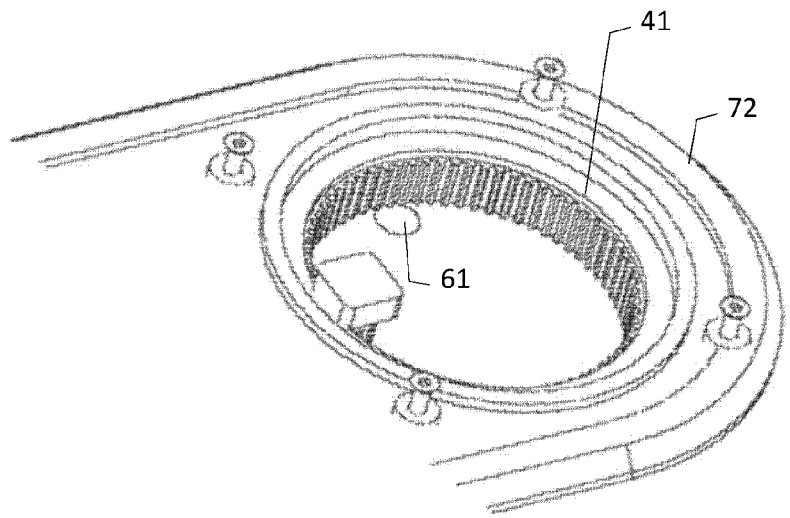
FIG. 7b is a perspective view of an embodiment similar to the embodiment in FIG. 7a. As will be seen, some of the elements, such as the top of the actuator (36) and the actuator frame (74) have been removed to increase readability of the figure.

FIG. 7b is a perspective view of the same elements, but without the upper part of the actuator and the actuator frame.

Above the described elements there is preferably a housing (not shown) protecting the interior parts of the stabilizer device (10) as well as providing a second layer of leakage prevention.

In an embodiment the housing comprises cooling means to cool the fin displacement actuator (36)

A similar implementation can be used for the second wheel (241) described above.

In an embodiment the trailing edge (53) at said fin tip (12) is bent away from a plane defined by said blade forward direction (fb) and said first axis (A1), to give the trailing edge (53) a concave profile in a lateral direction perpendicular to said plane.

Such a fin blade profile is defined in some of the Figures, e.g., 2a, 3a, 4d, 5b and 6b. The embodiment has the effect that the direction of the applied forces becomes more ideal for the intended task, e.g., anti-roll, the fins can be smaller in size, causing less drag, have the same roll reduction force with a considerably smaller direct power consumption and be able to apply more force in the desired direction with less force applied in an undesired direction, and thereby also causing less unwanted other movements of the watercraft. Thus, the hull element (38) may be more compact, while still achieving the same stabilizing effect, compared to a traditional straight fin.

The actuation of the link elements (35, 235) above can be accomplished with different types of actuation systems according to prior art. The actuators will typically be hydraulic or electric for the purpose of actuating a stabilizer. In most of the drawings electric actuators have been used for illustration, while an hydraulic actuator has been used for illustration in FIGS. 4c and 4d. However, for the purpose of the invention, the type of actuator used in each specific embodiment is not critical. Any suitable actuator, e.g. hydraulic or electric, presently available for the person skilled in the art, may be used.

The actuator or actuators above will be controlled by a control system that calculates in real time the required actuation to achieve the desired effect. The actual calculation will take into account e.g. roll, pitch, sway and speed of the boat. If connected to an autopilot, it can also take into the account the derivation from the desired course, since the stabilizer embodiments with independent rotation of the two link elements can be used for controlled propulsion of the boat.

Figure 9:
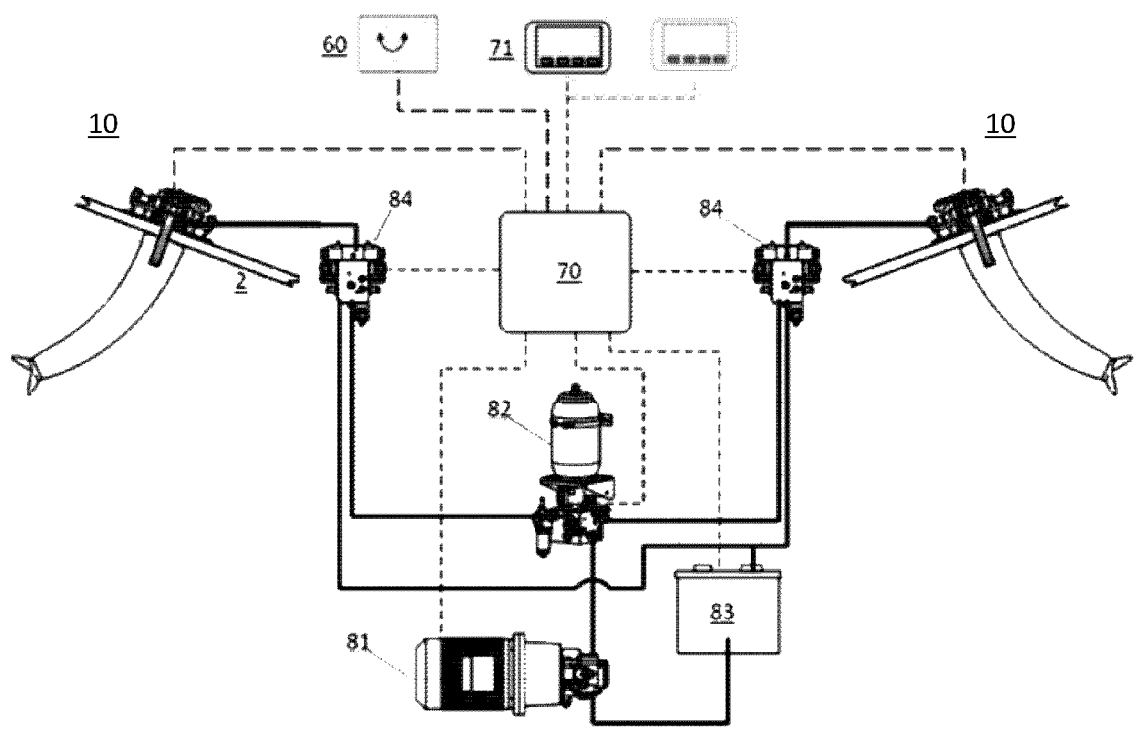
FIG. 9 illustrate a fin stabilizer system for a watercraft according to the invention.

In an embodiment the invention illustrated in FIG. 9, an active fin stabilizer system for a watercraft with a hull (2) with a centerline is shown. The active fin stabilizer system comprises first and second stabilizer devices (10) according to any of the embodiments described above, arranged to be mounted to the hull (2) on port and starboard sides of the centerline, respectively. Further it comprises a roll sensor (60), and a control system (70), wherein the control system is arranged for receiving roll indication sensor signals from the roll sensor (60), and further arranged for sending control signals to the first and a second stabilizer devices (10) to counteract roll of the watercraft.

In FIG. 9 the dashed lines represent electrical connections, while solid lines represent hydraulic connections.

The other components illustrated in the figure, is a hydraulic pump (81), which can be an electric driven hydraulic powerpack or any other suitable pump.

In addition, a hydraulic tank (83), hydraulic accumulator (82) and valve units (84) are common components of a hydraulic system. There may be separate valve units (84) for each hydraulic actuator (36, 136, 236) on a stabilizer device (10).

The illustration in FIG. 7 is just one example of how to implement an active stabilizer system according to the invention. In other implementations there could e.g. be one pump for each stabilizer fin, one pump for each actuator etc., electric actuators etc.

The roll sensor (60) sends a roll signal to the control system (70) that will open and close the valve units (84) depending on the current roll.

One or more control panels (71) may be used for setting the anti-roll parameters, e.g. turning anti roll on and off, and to present roll parameters to the operator.

The invention claimed is:

1. A stabilizer device for a watercraft with a hull, wherein the stabilizer device comprises;
    a fin blade with a fin base, a fin tip, a leading edge, and a trailing edge, wherein a blade forward direction is defined from the trailing edge to the leading edge at the fin base, wherein the fin blade comprises a first fin connection element connected to the fin base at a first fin connection point;
    a hull element arranged to be fixed to the hull with a hull forward direction in a forward direction of the hull; and
    a fin blade displacement portion connected to the first fin connection element and the hull element and arranged for displacing the first fin connection point a first displacement, in parallel with a lower surface of the hull, and perpendicular to the hull forward direction, wherein the fin blade displacement portion comprises a first link element interconnecting the hull element and the first fin connection element and a fin displacement actuator arranged to reversibly pivot the first link element,
    wherein the first fin connection element is an axle rotationally fixed to the fin base, and extending out of the fin base, wherein the fin blade displacement portion is arranged for pivoting the first fin connection element about a first axis at a rotational angle, and wherein the hull element is connected to the fin base only in the first connection point.

2. The stabilizer device of claim 1, wherein the fin blade displacement portion is further arranged for pivoting the fin base about the first connection point.

3. The stabilizer device of claim 2, wherein the hull element has a lower surface facing the fin base, and wherein the fin blade displacement portion is arranged for pivoting the fin base about a first axis, perpendicular to the lower surface, through the first connection point.

4. The stabilizer device of claim 1, wherein said first link element is arranged to pivot about a second axis that is fixed relative the hull element and further perpendicular to the lower surface.

5. The stabilizer device of claim 4, wherein the first link element is a wheel with a rotational axis coaxial with the second axis, wherein the first fin connection element is connected to a periphery of the wheel.

6. The stabilizer device of claim 5, wherein the hull element comprises a circular opening in the lower surface, and the wheel is arranged to rotate in the circular opening.

7. The stabilizer device of claim 4, wherein the first link element is an internal cog wheel meshing with a cog of the fin displacement actuator.

8. The stabilizer device of claim 1, wherein the rotational angle is a fixed function of the first displacement, and wherein the rotational angle increases with increasing first displacement.

9. The stabilizer device of claim 4, wherein a rotational angle is a fixed function of a rotation of the first link element, and wherein the fin blade displacement portion is arranged for pivoting the fin base about a first axis in a rotational direction opposite the rotation of the first link element about the second axis.

10. The stabilizer device of claim 9, wherein the fin blade displacement portion comprises a mechanical transmission interconnecting the fin displacement actuator and the fin connection element, wherein the mechanical transmission is arranged to rotate the first fin connection element with a rotational direction opposite a first rotation about the second axis through the first connection point and perpendicular to the lower surface.

11. The stabilizer device of claim 1, wherein the fin blade displacement portion comprises a first fin rotation actuator arranged for rotating the first fin connection element.

12. The stabilizer device of claim 1, wherein the first link element is a two-link linkage.

13. The stabilizer device of claim 1, wherein the trailing edge at the fin tip is bent away from a plane defined by the blade forward direction and a first axis, to give the trailing edge a concave profile in a lateral direction perpendicular to the plane.

14. A stabilizer device for a watercraft with a hull, wherein the stabilizer device comprises;
- a fin blade with a fin base, a fin tip, a leading edge, and a trailing edge, wherein a blade forward direction is defined from the trailing edge to the leading edge at the fin base, wherein the fin blade comprises a first fin connection element connected to the fin base at a first fin connection point;
- a hull element arranged to be fixed to the hull with a hull forward direction in a forward direction of the hull; and
- a fin blade displacement portion connected to the first fin connection element and the hull element and arranged for displacing the first fin connection point a first displacement, in parallel with a lower surface of the hull, and perpendicular to the hull forward direction, wherein the fin blade displacement portion comprises a first link element interconnecting the hull element and the first fin connection element and a fin displacement actuator arranged to reversibly pivot the first link element,
- wherein said first link element is arranged to pivot about a second axis that is fixed relative the hull element and further perpendicular to the lower surface, and
- wherein the first link element is a wheel with a rotational axis coaxial with the second axis, wherein the first fin connection element is connected to a periphery of the wheel.

15. A stabilizer device for a watercraft with a hull, wherein the stabilizer device comprises;
- a fin blade with a fin base, a fin tip, a leading edge, and a trailing edge, wherein a blade forward direction is defined from the trailing edge to the leading edge at the fin base, wherein the fin blade comprises a first fin connection element connected to the fin base at a first fin connection point;
- a hull element arranged to be fixed to the hull with a hull forward direction in a forward direction of the hull;
- a fin blade displacement portion connected to the first fin connection element and the hull element and arranged for displacing the first fin connection point a first displacement, in parallel with a lower surface of the hull, and perpendicular to the hull forward direction, wherein the fin blade displacement portion comprises a first link element interconnecting the hull element and the first fin connection element and a fin displacement actuator arranged to reversibly pivot the first link element;
- a second link element; and
- a second fin connection element that is extending from the fin base and fixed in a lateral direction relative the fin base,
- wherein the second link element interconnects the hull element and the second fin connection element, and
- wherein the fin blade displacement portion is further arranged for displacing the second fin connection element and the fin base laterally relative the hull forward direction.

16. The stabilizer device of claim 1, wherein the fin tip of the fin blade has a length and a width shorter than the length, and wherein the first axis extends at an oblique angle to a direction of the length of the fin tip of the fin blade.

17. The stabilizer device of claim 16, wherein the hull forward direction and the blade forward direction are parallel to the direction of the length of the fin tip.

* * * * *